J. J. DUCK.
BUSHING FOR ELECTRIC WIRING.
APPLICATION FILED MAY 12, 1917.

1,251,487.

Patented Jan. 1, 1918.

INVENTOR
John J. Duck.
By Owen, Owen & Crampton,
His attys.

UNITED STATES PATENT OFFICE.

JOHN J. DUCK, OF TOLEDO, OHIO.

BUSHING FOR ELECTRIC WIRING.

1,251,487.  Specification of Letters Patent.  Patented Jan. 1, 1918.

Application filed May 12, 1917. Serial No. 168,268.

*To all whom it may concern:*

Be it known that I, JOHN J. DUCK, a citizen of the United States, and a resident of Toledo, in the county of Lucas and State of Ohio, have invented a certain new and useful Bushing for Electric Wiring; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to bushings for the wire receiving openings of switch boxes, outlet boxes, plates, etc., used in connection with electric wiring, and has for its object the provision of a simple, inexpensive and improved bushing of this character, which is capable of being easily and quickly snapped into place within an opening from one side of the wall in which disposed.

The invention is fully described in the following specification, and while, in its broader aspect, it is capable of embodiment in numerous forms, a preferred embodiment thereof is illustrated in the accompanying drawings, in which—

Figure 1:
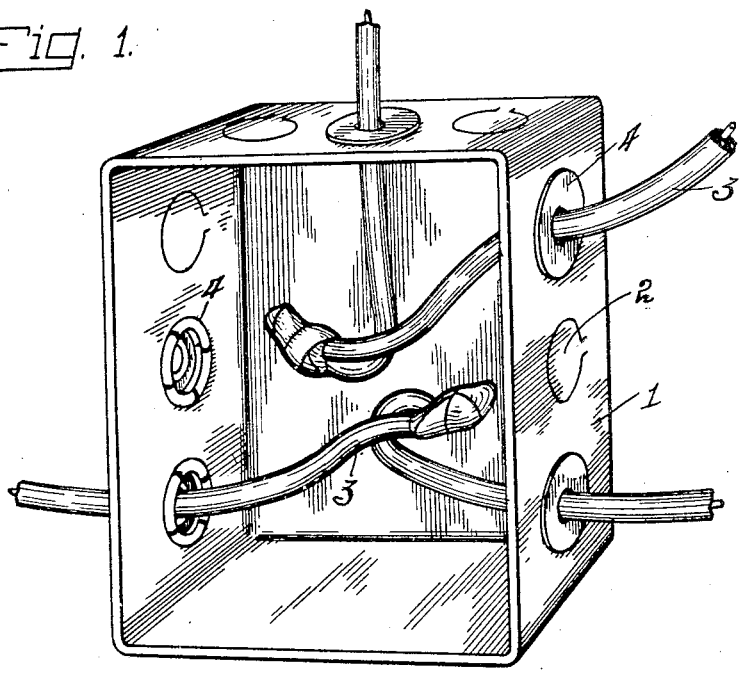
Figure 2:
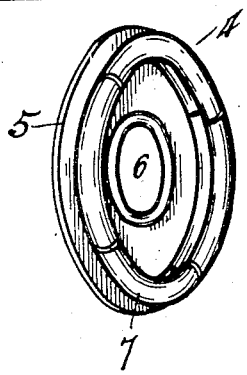
Figure 3:
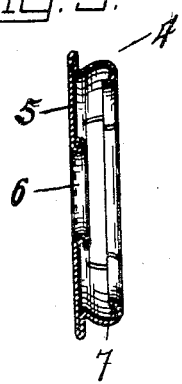

Figure 1 is a perspective view of an outlet box with the openings thereof through which the electric wires pass provided with a bushing embodying the invention. Fig. 2 is an enlarged perspective view of one of the bushings, and Fig. 3 is a central sectional view thereof.

Referring to the drawings, 1 designates an outlet box for electric wiring, the walls of which box are provided with a plurality of knock-outs 2 closing openings through which electric wires 3 may be passed, as well understood in the art. It is customary to mount bushings in these openings to prevent the insulated covering of wires from having contact with the sharp edge walls of the opening, and bushings 4 embodying the invention are shown mounted in some of the box openings in Fig. 1.

This bushing comprises a collar 5, which is larger in diameter than the opening into which the bushing is to be inserted and is provided in its center with an opening 6 for the reception of a wire. It is preferable to inwardly roll the edge wall of the opening 6 to avoid a sharp or cutting edge. A flange 7 projects from the inner side of the collar 5 in inwardly spaced relation to its outer edge and in the general direction of its axis, and flares outward and then rolls inward to provide an outer rounded edge to prevent cutting a wire covering resting thereagainst. The flange 7 is split, preferably in several places, to adapt it to be contracted under a radial compressing strain. The inner end of the flange is of a diameter to be received by an opening in an outlet box or the like, while the flared portion of the flange is slightly larger in diameter than such opening and requires compressing to enter the opening. The flange 7 being only slightly larger at its flared portion than a box opening, is adapted to be compressed and the bushing snapped into position in an opening or removed therefrom by pressure against one end or the other of the bushing, as is apparent, the outer projecting edge of the collar serving as a stop for limiting the inserting movement of the bushing.

It is evident that I have provided a bushing which is simple and inexpensive in its construction and is capable of being easily and quickly inserted into an opening from either side thereof or removed therefrom. It is also evident that the bushing, when applied to an opening in a plate or box wall, does not project to any considerable extent from either side thereof but is substantially flush therewith, which is an important feature in many wiring jobs not only on account of appearance but also for economy of space.

I wish it understood that my invention is not limited to any specific construction, arrangement or form of the parts, as it is capable of numerous modifications without departing from the spirit of the claims.

Having thus described my invention, what I claim as new, and desire to secure by Letters Patent, is—

1. A bushing of the class described, comprising a collar having a compressible flange projecting from one side thereof for forcible insertion into an opening, said collar having a wire receiving opening therethrough.

2. A bushing of the class described, comprising a wire receiving collar having a compressible flange projecting from one side thereof for forcible insertion into an opening, said collar having a portion at its outer edge extended without said flange.

3. A bushing of the class described, comprising a wire receiving collar having a compressible flange flaring outward in inwardly spaced relation to the outer edge of the collar to adapt it to be snapped into a receiving opening.

4. A bushing of the class described, comprising a wire receiving collar having the edge wall of its opening rounded and having a split compressible flange flaring outward from one side of the collar adjacent to its outer edge and then rolling inward in reëntrant form, said flange adapted to be snapped into a receiving opening.

In testimony whereof, I have hereunto signed my name to this specification.

JOHN J. DUCK.